United States Patent [19]
West

[11] Patent Number: 4,915,568
[45] Date of Patent: Apr. 10, 1990

[54] VEHICLE RESTRAINING APPARATUS

[76] Inventor: David E. West, 1544 Basswood Ct., Lilburn, Ga. 30247

[21] Appl. No.: 333,106

[22] Filed: Apr. 4, 1989

Related U.S. Application Data

[63] Continuation-in-part of Ser. No. 159,825, Feb. 24, 1988, abandoned.

[51] Int. Cl.⁴ .............................................. B65G 67/02
[52] U.S. Cl. ..................................... 414/401; 14/71.1; 414/584
[58] Field of Search ....................... 414/396, 401, 584; 14/69.5, 71.1

[56]  References Cited

U.S. PATENT DOCUMENTS

| | | | |
|---|---|---|---|
| 4,127,856 | 11/1978 | Bickel | 14/71.1 X |
| 4,472,099 | 9/1984 | Hahn et al. | 414/401 |
| 4,488,325 | 12/1984 | Bennett et al. | 14/71.3 |
| 4,589,813 | 5/1986 | Hagen et al. | 414/401 |
| 4,630,989 | 12/1986 | Davey | 414/401 |
| 4,664,582 | 5/1987 | Edmeads | 414/401 |
| 4,692,755 | 9/1987 | Hahn | 414/401 X |
| 4,695,216 | 9/1987 | Erlandsson | 414/401 |
| 4,728,242 | 3/1988 | Erlandsson | 414/401 |
| 4,735,542 | 4/1988 | Fisher et al. | 414/401 |
| 4,759,678 | 7/1988 | Hageman | 414/401 |
| 4,767,254 | 8/1988 | Kovach et al. | 414/401 |

Primary Examiner—David A. Bucci
Attorney, Agent, or Firm—Thomas & Kennedy

[57]  ABSTRACT

A truck restraining apparatus has a vertically extending jackscrew (18) to which a follower nut (38) is mounted. A hook shaped restraining member (36) is resiliently coupled to the follower nut and moves therewith when the jackscrew is rotated. The hook shaped member engages the ICC bar of a truck to restrain it from moving, while the resilient coupling compensates for float.

14 Claims, 2 Drawing Sheets

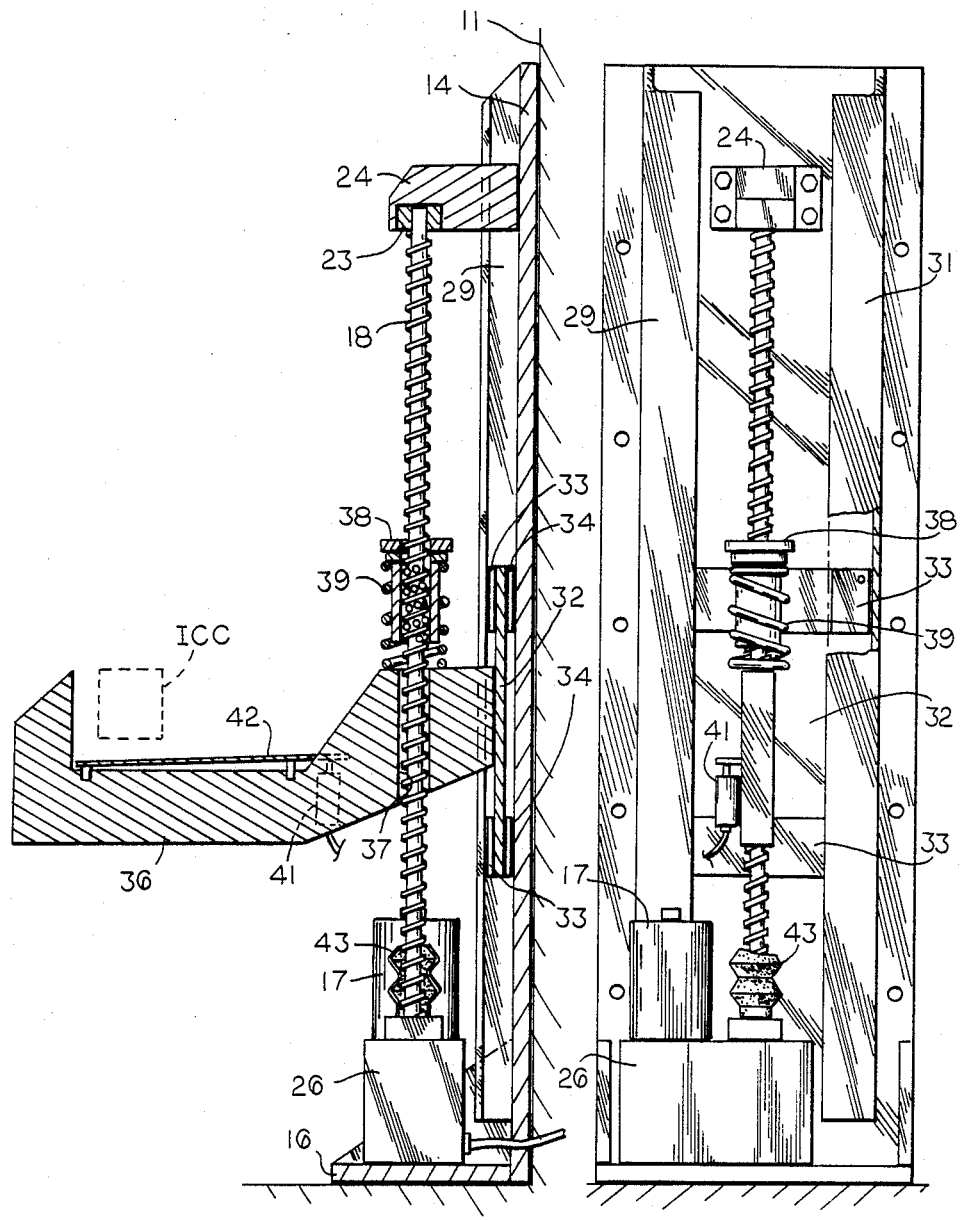

VEHICLE RESTRAINING APPARATUS

REFERENCE TO RELATED APPLICATION

This application is a continuation-in-part of Applicant's U.S. patent application Ser. No. 07/159,825, filed Feb. 24, 1988.

TECHNICAL FIELD

This invention relates to restraining devices and apparatuses, and particularly to a truck restraining apparatus for use at loading and unloading docks.

BACKGROUND OF THE INVENTION

Where a large truck, such as a tractor-trailer arrangement, is backed into a loading dock for loading or unloading, it is necessary that the truck be, in some way, anchored in position and prevented from pulling away from the dock. It has been found that simply chocking the wheels is inadequate, and highly dangerous to personnel. As a consequence, numerous restraining devices have been devised, designed to achieve positive restraint while minimizing danger to personnel and to the truck itself.

Typical of such devices are those shown in U.S. Pat. No. 4,472,099 of Hahn et al and U.S. Pat. No. 4,695,216 of Erlandsson. In the Hahn et al arrangement, there is a vertically movable carriage member carrying a hook for engaging the ICC bar of a trailer. The carriage is suspended from a pair of springs, and as the trailer is backed into position, the ICC bar engages the carriage and forces it down, thereby tensioning the springs. The hook is electrically moved into hooking position, and is held there by the motor. Such an arrangement has serious disadvantages, e.g., the constant physical contact between the ICC bar and the carriage results in rapid deterioration and eventual dislodgement of the carriage, the two springs must be matched as to tension, otherwise the carriage may become locked and jammed in its track, and finally, the hook will disengage if there is a failure of hydraulic pressure.

The Erlandsson arrangement likewise uses physical contact between the carriage and the ICC bar, wherein the ICC bar rides up a sloping face of the carriage to the hooked position. Such an arrangement is easily broken or damaged by this contact and, as a consequence, is not completely reliable.

In U.S. Pat. No. 4,759,678 of Hageman, there is shown an arrangement that utilizes a movable carriage carrying a hook or restraining member. The carriage is moved vertically by means of a pneumatic actuated piston, which also moves the hook into operative position. The carriage and hook are maintained in operative position by the air pressure on the piston. Hence a leak in the fluid supply, for example, can result in the hook disconnecting prematurely. This unit also involves expensive installation fees.

When a truck is being loaded, the bed of the truck will be lowered as the load is increased. In a similar manner, the bed of the truck will rise as the load is decreased. It is desirable that this action, known as "float", be compensated for to insure that the restraining member does not disengage. In both the Hageman and the Hahn et al arrangements, provision is made for compensating for the float. The springs of Hahn et al compensate to an extent, but, as pointed out, unless the springs are virtually identical, locking and jamming of the carriage can occur. Hageman's pneumatic piston likewise compensates for float due to the compressibility of the air, but, as pointed out, leakage or loss of air can result in failure of the system.

The problems and dangers associated with the use of pneumatic, fluid or hydraulic drives can be eliminated by the use of direct, positive drives. Arrangements utilizing positive drives are shown in U.S. Pat. No. 4,589,813 of Hagen et al and U.S. Pat. No. 4,735,542 of Fisher. The Hagen et al arrangement utilized a rack and pinion to drive a restraining bar into its operative position, while the Fisher arrangement utilizes, in one embodiment, a jack screw upon which is mounted a screw follower which is connected, in turn, either directly or indirectly, to the restraining member. The Hagen et al arrangement exposes the drive means, i.e., the rack, to the ICC bar, by which it can easily be damaged. The Fisher arrangement is configured to be sunk into the ground, which creates problems of access, cleanliness and the like. Neither structure is adapted to accommodate float and compensate therefor.

SUMMARY OF THE INVENTION

The present invention is a truck restraining apparatus comprising a vertically oriented mounting plate having formed on the front face thereof, first and second guide tracks in which a slide plate is adapted to move vertically. Attached to the front of the slide plate is a hook shaped restraining member. A vertically oriented jack screw is mounted to the mounting plate at a position in front of the track and movable plate. The jackscrew passes through a bore in the restraining member and is held in position by brackets on the mounting plate. Means, such as an electric motor, are provided for rotating the jackscrew. A screw follower nut, mounted on the jack screw, is connected to the restraining member by means of a heavy coil spring, mounted to the screw follower and coaxially with the jack screw. When the motor rotates the jackscrew, the screw follower nut moves vertically up or down, depending upon the direction of rotation of the screw, carrying the restraining member and the slide plate with it. A limit switch mounted on the restraining device stops the drive motor when the restraining member contacts the ICC bar of the truck.

With this arrangement the problems and shortcomings of fluid, pneumatic, impact positioned and hydraulic drive systems are eliminated. In addition, the apparatus is compact and does not protrude out from the wall as far as the standard rubber bumpers, hence it is in little danger of being hit by the truck. Furthermore, with the coaxially mounted spring connecting the screw follower nut and the restraining member, float can be accommodated without having the slide plate cock or bind within the guide track. In addition, the resilient connection between the drive screw and the driver restraining means prevents damage, especially to the drive mechanism, in the event of the restraining means hitting an obstruction.

BRIEF DESCRIPTION OF THE DRAWING

FIG. 2 is a side elevation, sectional view of the the invention.

FIG. 3 is a front view of the apparatus of the invention.

DETAILED DESCRIPTION

Figure 1:
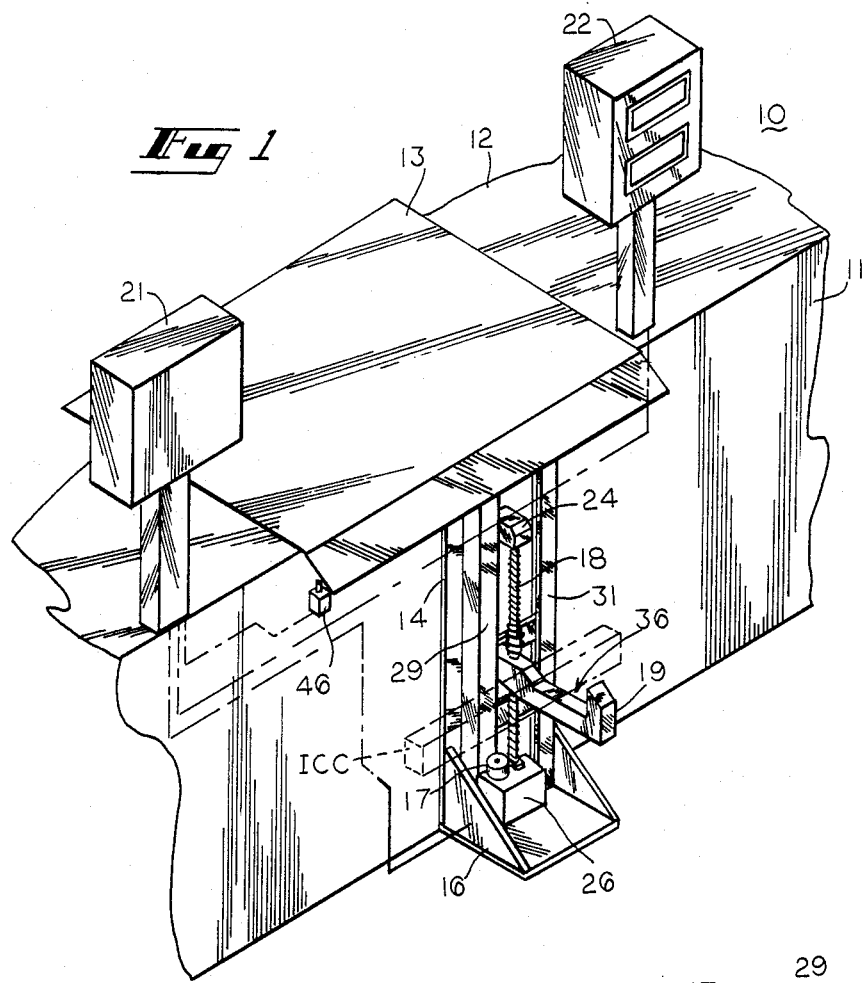
FIG. 1 is a perspective, partial view of a portion of a loading dock with the apparatus of the invention in place.

In FIG. 1 there is depicted a portion of a loading dock 10 having a vertical face 11, which faces the rear of a truck backed into the dock 10 for loading or unloading. Dock 10 also has a horizontal surface or platform 12 which has mounted thereon a dock leveler 13 for providing access to the floor of the truck.

Mounted on vertical face 11 is a restraining apparatus of the present invention. It comprises a mounting plate 14 having its longitudinal axis vertically oriented and a base plate 16 upon which is mounted a drive mechanism 17 for rotating a vertically oriented jack screw 18 for driving a truck restraining member 19 vertically, for engaging with the truck ICC bar shown in dot-dash lines.

Mounted on horizontal surface 12 is a control panel 21 for actuating the drive mechanism 17 and a signaling box 22. Panel 21 and box 22 may take any of a number of forms, all within the purview of workers in the art. Dot-dash lines schematically represent the electrical connections between the apparatus and the box 22 and panel 21.

Figure 4:
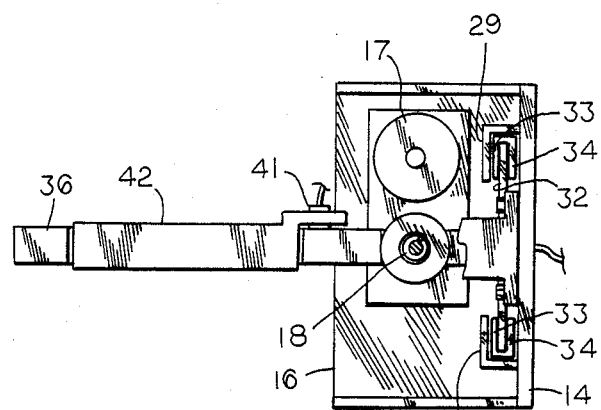
FIG. 4 is a top view of the apparatus of the invention.

FIGS. 2, 3 and 4 depict the restraining mechanism of the present invention in greater detail. Mounting plate 14 is affixed to face 11 by any suitable means, not shown, designed to withstand high tension loading as occurs when a loaded truck pulls away from the dock. Mounted above base plate 16 is an electric drive motor or mechanism 17 to which is connected the vertically extending jackscrew 18. The upper end of jackscrew 18 terminates in a bushing or bearing 23 mounted in a support member 24 which is mounted on plate 14, so that jackscrew 18 is spaced from plate 14. Operation of motor 17 causes rotation of jackscrew 18 through a reduction gear train 26 which reduces the speed of rotation to a manageable rate.

Mounted on plate 14 are first and second flange members which form vertically extending guides of tracks 29 and 31, respectively. A slide plate 32 has applied at each end thereof layers 33,34 of Teflon or other suitable low friction material capable of sliding easily within the guides 29 and 31. As can be seen in FIG. 2, the ends of plate 32, with the material 33,34 in place, substantially fill the guides 29 and 31 so that, while plate 32 can move easily within the guides 29 and 31, it is substantially prevented from cocking at an angle to the vertical. This is especially the case since the material 33,34 extends around the sides of plate 32, as best seen in FIG. 4.

Mounted on the front face of plate 32 is a hook shaped restraining member 36 having a bore 37 therein through which freely passes jackscrew 18. A ball bearing screw follower nut 38 of a type that is commercially available is mounted on the jackscrew 18 above the restraining member 36. A heavy duty industrial type coil spring 39 is connected at one end to nut 38 and at the other end to restraining member 36, as by welding. With such a resilient connection between nut 38 and member 36, when jackscrew 18 is rotated so that nut 38 rises vertically, member 36 and hence plate 32 are pulled up with it. When member 36 is prevented from rising further by contact with the ICC bar, shown in dot-dash lines in FIG. 2, or with an obstruction, the spring 39 acts as a shock absorber to prevent damage to the mechanism. In addition, as the truck is loaded, its bed, and hence the ICC bar, sink, thus forcing member 36 downward. Spring 39 in this case compensates for this float. As spring 39 surrounds jackscrew 18 and is coaxial therewith, any forces are central to the system, and hence to plate 32. As a consequence, there is little or no tendency for plate 32 to cock and jam.

A limit switch 41 and actuator 42 are mounted on the truck restraining member 36, with the actuator, which is spring loaded, being adjacent to the top or contact surface of member 36. Limit switch 41 functions to cut the circuit to the electric motor 17 when the underside of the ICC bar is contacted during upward travel of the member 36.

In order to maintain the jackscrew 18 substantially free of dirt and grease, an accordion type sleeve or grommet 43 surrounds and encases jackscrew 18. Only a short portion of the sleeve 43 has been shown. In actuality sleeve 43 extends from the top of gear box 26 to the underside of member 36, and a second sleeve, not shown, extends from the top of nut 38 to the bearing 23.

In operation, when a truck has been backed into position, an operator activates the system at this control panel 21, or alternatively, a whisker switch 46 beneath the dock leveler, as seen in FIG. 2, can be used to activate the system. With the system activated, the drive mechanism through gear box 26 rotates the jackscrew 18 causing nut 38 to rise, pulling member 36 and plate 32 upward. When member 36 contacts the ICC bar, actuator 42 actuates switch 41, turning off the drive. At the same time, a red light, for example, in signal box 22, informs the truck driver that the system is now restraining the truck. If, during unloading, the truck bed, and hence the ICC bar, rises, member 36 may be momentarily out of contact with the ICC bar. However, if the rise is enough for switch actuator 42 to move off switch 4, then the drive mechanism starts to drive member 36 upward until switch 41 is again activated.

In the event that member 36 fails to make contact with the ICC bar, it will travel to the top of the mechanism, where a limit switch, not shown, may be positioned for reversing the drive, and member 36 will then return to its bottom or at rest position.

When the restrained truck is ready to leave, the operator actuates a disengage switch on the control panel, which reverses the drive mechanism and lowers member 36, freeing the truck from restraint.

An improved truck restraint apparatus has been shown and described in a preferred embodiment thereof. Numerous changes may occur to workers in the art without departure from the spirit and scope of the invention as set forth in the following claims.

I claim:

1. Apparatus for restraining a parked vehicle from moving from a dock that has a vertical wall facing the rear of the vehicle, and with the apparatus comprising
    a mounting plate having a longitudinal axis adapted to be mounted to the vertical wall with its longitudinal axis oriented generally vertically, said mounting plate having vertically extending guide means,
    slide means adapted to move vertically within said guide means,
    vehicle restraining means mounted to said slide means and adapted to move therewith, and
    means for moving said restraining means and said slide means in a generally vertical direction comprising a generally vertically extending rotatable screw member, a screw follower mounted on said screw member, means for resiliently connecting said screw follower to said restraining means, and means for rotating said screw member to cause said screw follower, said restraining means and said slide means to move vertically.

2. The apparatus of claim 1 wherein said restraining means is adapted to contact the parked vehicle and includes means for disabling said moving means in response to said restraining means contacting the parked vehicle.

3. The apparatus of claim 1 wherein said means for resiliently connecting said screw follower to said restraining means comprises a coil spring.

4. The apparatus of claim 3 wherein said coil spring surrounds said screw member and is coaxial therewith.

5. The apparatus of claim 1 wherein said means for rotating said screw member comprises an electric motor and a reduction gear assembly coupled with said screw member.

6. The apparatus of claim 1 wherein said slide means comprises a plate having first and second ends, each end having first and second layers of low friction material mounted thereon.

7. The apparatus of claim 6 wherein said low friction material is Teflon.

8. A vehicle restraining apparatus for preventing a vehicle parked adjacent a loading dock from moving away from the dock and the loading dock has a vertical wall facing the rear of the vehicle, said apparatus comprising a mounting member mounted to the vertical wall of the loading dock and having a longitudinal axis oriented vertically, said mounting member having first and second spaced members forming guideways extending parallel to said longitudinal axis, a slide plate mounted in said guideways and adapted to move vertically therein, a restraining member mounted to said slide plate and extending outwardly therefrom, said restraining member having a vertically oriented bore therein, and means for moving said restraining member in a vertical direction, said means for moving comprising a vertically oriented rotatable screw member mounted to said mounting member and passing through said restraining member bore, a screw follower member mounted on said screw member, resilient means coaxial with said screw member attached to said screw follower member and said restraining member, and means for rotating said screw member to cause said screw follower, said restraining member, and said slide plate to move vertically.

9. The vehicle restraining apparatus of claim 8 wherein said means for rotating said screw member comprises an electric motor and gear box.

10. The vehicle restraining apparatus of claim 9 wherein said restraining member is adapted to contact the parked vehicle, and further including means for deactivating said electric motor upon said restraining member contacting the parked vehicle.

11. The vehicle restraining apparatus of claim 10 wherein said means for deactivating said electric motor comprises a switch member and a switch actuator mounted on said restraining member in a position to contact the parked vehicle, and adapted to actuate said switch when contact occurs.

12. Apparatus for restraining a truck parked in a position closely adjacent a loading dock and with the apparatus comprising, in combination, a screw adapted to be mounted upright beside the dock, motor means for rotating said mounted to said screw follower telescopically about said screw, and a hook carried by said spring for movement into and out of restraining engagement with a truck.

13. The apparatus of claim 12 wherein said hook has a channel through which said screw extends.

14. The apparatus of claim 13 further comprising a track mounted uprightly beside said screw and a slide mounted to said hook in sliding engagement with said track.

* * * * *